US010558658B2

United States Patent
Wu et al.

(10) Patent No.: US 10,558,658 B2
(45) Date of Patent: Feb. 11, 2020

(54) PROPAGATION OF STRUCTURED QUERY LANGUAGE ASSOCIATIONS

(71) Applicant: SAP SE, Walldorf (DE)

(72) Inventors: Di Wu, Seoul (KR); Ki Hong Kim, Seoul (KR); Stefan Baeuerle, Rauenberg-Rotenberg (DE); Steffen Weinstock, Sinsheim (DE); Daniel Hutzel, Walldorf (DE); Zhi Qiao, Xi'an (CN)

(73) Assignee: SAP SE, Walldorf (DE)

( * ) Notice: Subject to any disclaimer, the term of this patent is extended or adjusted under 35 U.S.C. 154(b) by 493 days.

(21) Appl. No.: 15/596,905

(22) Filed: May 16, 2017

(65) Prior Publication Data

US 2018/0336245 A1    Nov. 22, 2018

(51) Int. Cl.
*G06F 16/00* (2019.01)
*G06F 16/2453* (2019.01)
*G06F 16/21* (2019.01)
*G06F 16/245* (2019.01)

(52) U.S. Cl.
CPC ...... *G06F 16/24535* (2019.01); *G06F 16/212* (2019.01); *G06F 16/245* (2019.01); *G06F 16/24537* (2019.01)

(58) Field of Classification Search
CPC ............ G06F 16/24535; G06F 16/245; G06F 16/24537; G06F 16/02
See application file for complete search history.

(56) References Cited

U.S. PATENT DOCUMENTS

| 7,814,090 B2 * | 10/2010 | Dhamija | G06F 16/24535 707/713 |
| 2007/0226196 A1 * | 9/2007 | Adya | G06F 16/24539 |
| 2017/0322973 A1 * | 11/2017 | Sreekantaiah | G06F 16/24535 |
| 2018/0004782 A1 * | 1/2018 | Greenwood | G06F 16/2423 |

* cited by examiner

*Primary Examiner* — Taelor Kim
*Assistant Examiner* — Lahcen Ennaji
(74) *Attorney, Agent, or Firm* — Mintz Levin Cohn Ferris Glovsky and Popeo, P.C.

(57) ABSTRACT

A method for propagating a structure query language (SQL) association can include determining, based at least on a syntax of a SQL create view statement, that a SQL association requires propagation to a SQL view associated with the SQL create view statement. The SQL association can combine data from at least a first data model and a second data model at a database. The SQL view can comprise at least a portion of the combined data. An association information data structure can be generated for storing information corresponding to a definition of the SQL association. The SQL create view statement can be executed based on the association information data structure. Related systems and articles of manufacture, including computer program products, are also disclose.

14 Claims, 6 Drawing Sheets

PROPAGATION OF STRUCTURED QUERY LANGUAGE ASSOCIATIONS

FIELD

The present disclosure generally relates to database processing and, more specifically, to the parsing and optimization of database queries.

BACKGROUND

Data held in a relational database can be accessed using structured query language (SQL) statements. A SQL statement can include commands for manipulating data in the relational database such as, for example, INSERT, SELECT, UPDATE, DELETE, and/or the like. Each command can be further associated with one or more clauses. In particular, a SQL JOIN clause can combine data from multiple database tables. As such, the inclusion of a SQL JOIN clause in a SQL statement can cause the corresponding command to be applied to data held in multiple database tables. For example, a SELECT command that is accompanied by a JOIN clause retrieves data from a combination of database tables in the relational database.

SUMMARY

Methods, systems, and articles of manufacture, including computer program products, are provided for propagating SQL associations. In some implementations of the current subject matter, there is provided a computer-implemented method. The method can include: determining, based at least on a syntax of a structure query language (SQL) create view statement, that a SQL association requires propagation to a SQL view associated with the SQL create view statement, the SQL association combining data from at least a first data model and a second data model at a database, and the SQL view comprising at least a portion of the combined data; generating an association information data structure storing information corresponding to a definition of the SQL association; and executing, based on the association information data structure, the SQL create view statement.

In some variations, one or more of the features disclosed herein including the following features can optionally be included in any feasible combination. The syntax of the SQL create view statement can include a reference to the SQL association. The definition of the SQL association can be omitted from the SQL create view statement. In response to determining that the SQL association requires propagation, an association propagation data structure can be generated for storing association propagation information.

In some variations, the association propagation information can include a schema of the first data model, a name of the first data model, a name of the SQL association, and/or an alias for the SQL association. The generating of the association information data structure includes populating the association propagation data structure with the information corresponding to the definition of the SQL association. The information corresponding to the definition of the SQL association can include a name of the association, a schema of the first data model, a name of the first data model, a schema of the second data model, a name of the second data model, a join condition, and a type of join.

In some variations, the SQL association can include a SQL join operation that combines, based on one or more conditions, data from the first data model and data from the second data model. A create view data structure corresponding to the SQL view can be generated. The create view data structure can include the association propagation data structure. The create view data structure can further include an indicator that the SQL view includes the SQL association that requires propagation.

In some variations, a SQL create table statement can be executed. The SQL create table statement can include the definition of the SQL association. The executing of the SQL create table statement can include storing the information corresponding to the definition of the SQL association as metadata.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
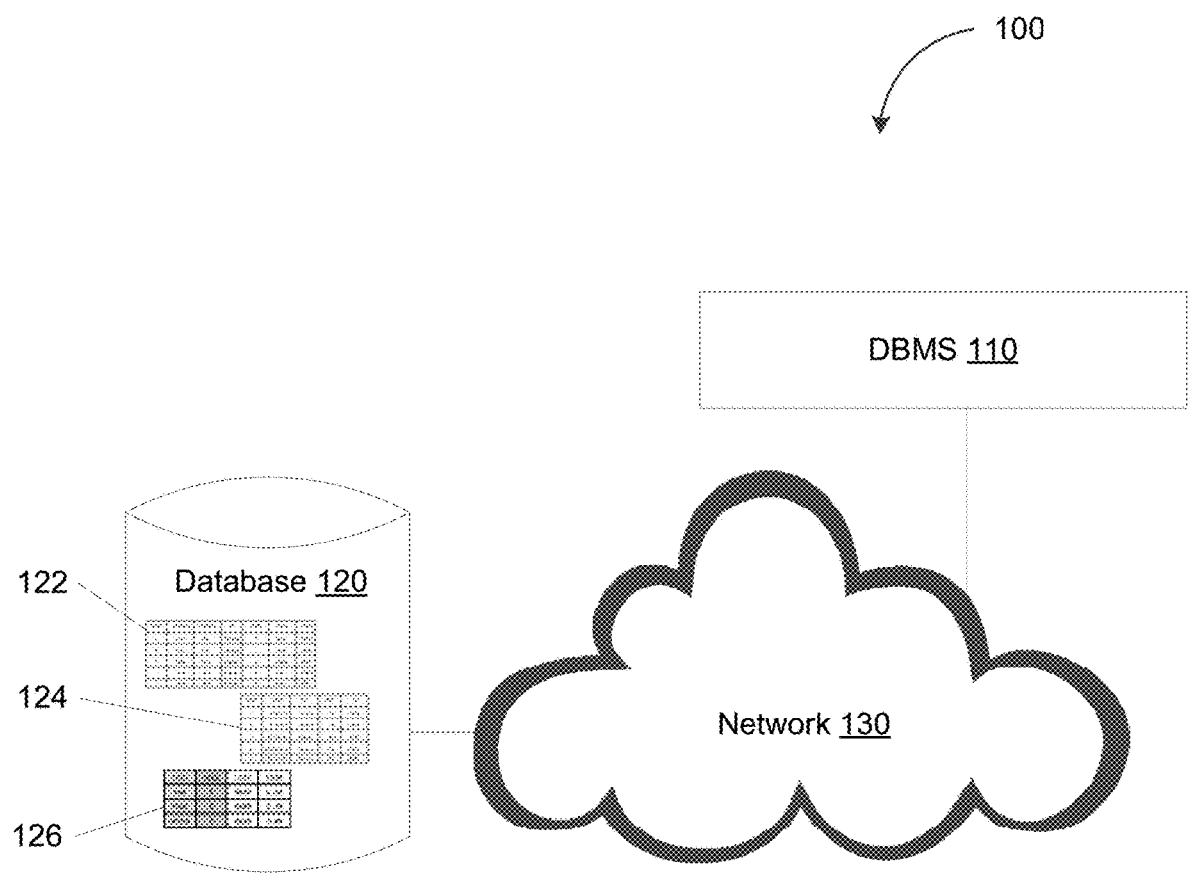
FIG. 1 depicts a system diagram illustrating a database system consistent with implementations of the current subject matter.

Like labels are used to refer to same or similar items in the drawings.

DETAILED DESCRIPTION

Standard SQL does not capture relationships between different data models such as, for example, the associations between the data held in multiple database tables. As such, a SQL statement, such as a database query, that requires related data from multiple database tables typically includes JOIN clauses to combine these database tables based on one or more JOIN conditions. To avoid having to repeatedly define the same JOIN clauses, the JOIN clauses in the SQL statement can be replaced with corresponding SQL associations. As used here, a SQL association is a forward-declared JOIN that captures the relationship between different data models. Additional details with regard to SQL associations are described in U.S. patent application Ser. No. 15/208,736, the disclosure of which is incorporated herein by reference. Although a SQL association can obviate the repeating of the same JOIN definitions, the SQL association itself still must be defined repeatedly in order to create SQL views on top of the SQL association. As such, in some implementations of the current subject matter, a SQL view can be created with a reference to an existing SQL association while the full definition of that SQL association is subsequently propagated to the SQL view.

FIG. 1 depicts a system diagram illustrating a database system 100 consistent with implementations of the current subject matter. Referring to FIG. 1, the database system 100 can include a database management system DBMS 110 that is communicatively coupled, for example via a network 130, to a database 120. The network 130 can be any wired and/or wireless network including, for example, a wide area network (WAN), a local area network (LAN), the Internet, and/or the like. The database 120 can be any type of database that supports SQL including, for example, a relational database.

The database 120 can hold a plurality of data models including, for example, a first data model 122, a second data model 124, and a third data model 126. As used herein, a data model can be represented as a database table in a relational database. However, it should be appreciated that a data model can be represented in any manner. In some implementations of the current subject matter, the DBMS 110 can provide an interface for interacting with the database 120 including, for example, creating, updating, and/or querying the data models in the database 120.

To further illustrate, the first data model 122, the second data model 124, and the third data model 126 can be defined based on the SQL CREATE TABLE statements depicted in Table 1. In this example, the first data model 122 is an EMPLOYEES table, the second data model 124 is an ADDRESSES table, and the third data model 126 is a CITIES table. The DBMS 110 can parse and execute the SQL CREATE TABLE statements set forth in Table 1 in order to generate the EMPLOYEES table, the ADDRESSES table, and the CITIES table at the database 120.

TABLE 1

CREATE TABLE Employees (name VARCHAR(20), id INTEGER, address_id INTEGER
CREATE TABLE Addresses (location VARCHAR(20), id INTEGER, city_id INTEGER)
CREATE TABLE Cities (name VARCHAR(20), id INTEGER)

The DBMS 110 can also parse and execute SQL statements querying the database 120. As noted earlier, in the absence of SQL associations, a query that requires related data from multiple data models must include JOIN clauses to combine data from these data models. To further illustrate, Table 2 below depicts a SQL SELECT statement retrieving data held in multiple data models such as, for example, the EMPLOYEES table, the ADDRESSES table, and the CITIES table. For instance, the DBMS 110 can parse and execute this SQL SELECT statement in order to retrieve, given the name of an employee, the name of the city at which that employee resides. The SQL SELECT statement set forth in Table 2 includes two JOIN clauses (e.g., LEFT OUTER JOIN) that combine data from different data models based on one or more JOIN conditions. The first JOIN clause combines data from the EMPLOYEES table and data from the ADDRESSES table that have the same address identifier. Meanwhile, the second JOIN clause combines data from the ADDRESSES table and data from the CITIES table that have the same city identifier. These same JOIN clauses may be repeated in other SQL statements that require related data from the EMPLOYEES table, the ADDRESSES table, and the CITIES table.

TABLE 2

SELECT Cities.name as city_name, Employees.name as employee_name FROM Employees
LEFT OUTER JOIN Addresses ON address_id = Addresses.id
LEFT OUTER JOIN Cities ON city_id = Cities.id
WHERE Employees.name = 'Tom'

In some implementations of the current subject matter, the introduction of SQL associations can eliminate the need to define the same JOIN clauses multiple times in different SQL statements. A SQL association can be defined by including a definition of the SQL association in the SQL statement that creates the underlying data model. Table 3 below depicts SQL statements that define the EMPLOYEES table, the ADDRESSES table, and the CITIES table. In contrast to the SQL CREATE TABLE statements set forth in Table 1, these definitions of data models include definitions of SQL associations that capture, via forward-defined JOIN clauses, the relationships between data models. For instance, the EMPLOYEES table can be defined to include a SQL association with the ADDRESSES table. Specifically, the SQL CREATE TABLE statement defining the EMPLOYEES table can include a JOIN clause that combine data from the EMPLOYEES table and data from the ADDRESSES table based on matching address identifiers. Moreover, the ADDRESSES table can also be defined to include a SQL association with the CITIES table. Here, the SQL CREATE TABLE statement defining the ADDRESSES table can include a JOIN clause that combine data from the ADDRESSES table and data from the CITIES table based on matching city identifiers.

In some implementations of the current subject matter, the DBMS 110 can parse and execute the SQL CREATE TABLE statements set forth in Table 4. During the parsing and execution of a SQL CREATE TABLE statement, the DBMS 110 can be configured to store, as metadata, information associated with the SQL associations defined within the SQL CREATE TABLE statement. This metadata enables subsequent propagation of these SQL associations to the definition of a SQL view operating on top of these SQL associations. The information associated with a SQL association can include the name of the data models (e.g., EMPLOYEES table, ADDRESSES table) and/or the name of the schemas that are being combined by the forward-defined JOIN underlying the SQL association. Furthermore, the information associated with a SQL association can include the conditions (e.g., matching address identifier) associated with the forward-defined JOIN. In addition, the information associated with a SQL association can include the type of JOIN that is the forward-defined JOIN clause underlying the SQL association. For instance, the forward-defined JOIN can be an INNER JOIN, a FULL OUTER JOIN, a LEFT OUTER JOIN, a RIGHT OUTER JOIN, and/or the like.

TABLE 3

CREATE TABLE Employees (name VARCHAR(20), id INTEGER, address_id INTEGER)
WITH ASSOCIATIONS(JOIN Addresses AS Address ON Address.id = address_id)
CREATE TABLE Addresses (location VARCHAR(20), id INTEGER, city_id INTEGER)

TABLE 3-continued

WITH ASSOCIATIONS(JOIN Cities AS City ON City.id = city_id)
CREATE TABLE Cities (name VARCHAR(20), id INTEGER)

It should be appreciated that the inclusion of SQL associations in the definition of data models can obviate the need to repeatedly define the same JOIN clauses. In this example, defining the EMPLOYEES table with a SQL association that links the EMPLOYEES table with the ADDRESSES table can eliminate JOIN clauses from subsequent SQL statements that require related data from both the EMPLOYEES table and the ADDRESSES table. Meanwhile, defining the ADDRESSES table with a SQL association linking the ADDRESSES table with the CITIES table can eliminate JOIN clauses from subsequent SQL statements that require related data from both the ADDRESSES table and the CITIES table. Table 4 below depicts a SQL SELECT statement that retrieves related data from across the EMPLOYEES table, the ADDRESSES table, and the CITIES table, where both the EMPLOYEES table and the ADDRESSES table have been defined with SQL associations. As shown in Table 4, the two JOIN clauses present in the SQL statement shown in Table 3 is no longer required.

TABLE 4

SELECT Address.City.name as city_name, Employees.name as employee_name FROM Employees)

The DBMS 110 can be configured to create SQL views that capture the result of other SQL statements. For instance, a SQL view can be a temporary table populated with the results of the SQL SELECT statement set forth above in TABLE 4. In some implementations of the current subject matter, the DBMS 110 can be configured to propagate an existing SQL association to a SQL view. As noted earlier, the DBMS 110 can store information associated with a SQL association when parsing and executing a SQL CREATE TABLE statement that defines a corresponding SQL association. Accordingly, a full definition of the SQL association can be omitted from the SQL CREATE VIEW statement creating a SQL view on top of this SQL association. To further illustrate, Table 5 depicts a SQL CREATE VIEW statement that includes the full definition of an existing SQL association. It should be appreciated that in the absence of SQL association propagation, the same SQL association definition is repeated in the SQL CREATE VIEW statement shown in Table 5 even though it is already defined in the SQL CREATE TABLE statement creating the EMPLOYEES table shown in Table 3.

TABLE 5

CREATE VIEW TempEmployees AS SELECT name, id,
address_id FROM Employees
WHERE id > 100 WITH ASSOCIATIONS (JOIN Addresses
AS Address ON Address.id = address_id)

By contrast, with SQL association propagation, the full definition of the existing SQL association can be omitted from subsequent SQL CREATE VIEW statements. Instead, information required to fully define the SQL association can be retrieved when the SQL CREATE VIEW statement is parsed and executed by the DBMS 110. Here, Table 6 depicts a SQL CREATE VIEW statement that includes a reference to the existing SQL association "Address" instead of a full definition of that SQL association. Notably, SQL association propagation prevents the same SQL association definition from being repeated in subsequent SQL CREATE VIEW statement, which creates the SQL view "TempEmployees" on top of the SQL association "Address."

TABLE 6

CREATE VIEW TempEmployees AS SELECT name, id, address_id
FROM Employees WHERE id > 100 WITH ASSOCIATIONS (Address)

Figure 2:
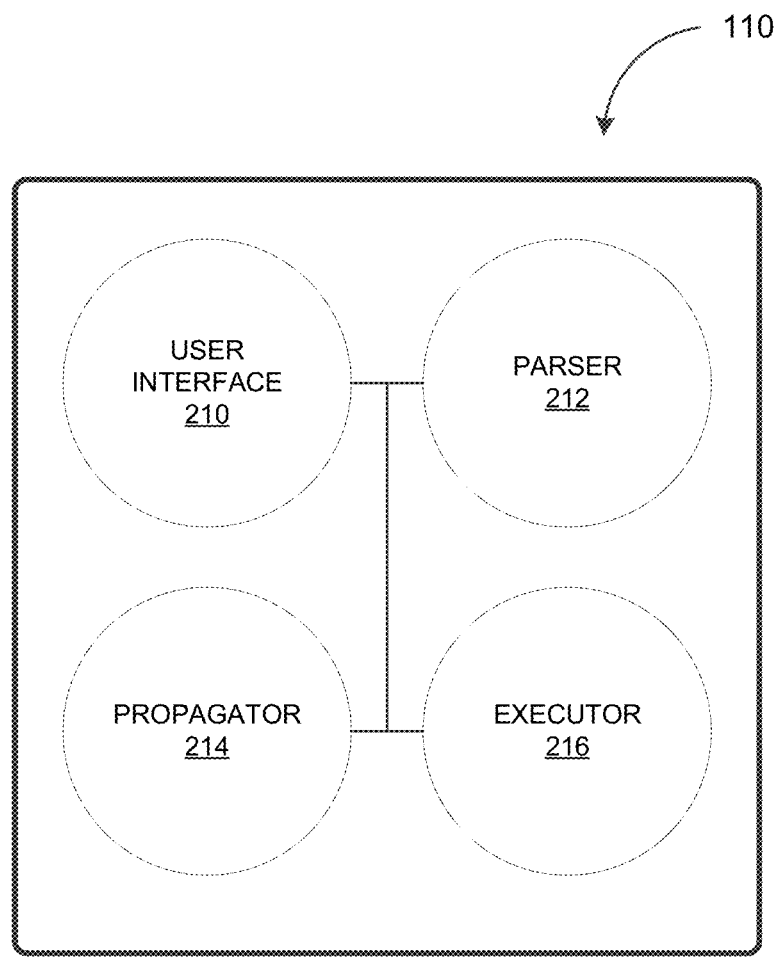
FIG. 2 depicts a block diagram illustrating a database management system (DBMS) consistent with implementations of the current subject matter.

FIG. 2 depicts a block diagram illustrating the DBMS 110 consistent with implementations of the current subject matter. Referring to FIGS. 1-2, the DBMS 110 can include a user interface 210, a parser 212, a propagator 214, and an executor 216. However, it should be appreciated that the DBMS 110 can include additional and/or different components than shown.

The user interface 210 can be configured to provide a user interface that enables a user to interact with the DBMS 110. For example, the user interface 210 can generate a graphic user interface (GUI) that can be used to input one or more SQL statements such as, for example, the SQL CREATE TABLE statements set forth in Table 3 and the SQL CREATE VIEW statement set forth in table 6. As noted earlier, data held at the database 120 can be accessed through interaction with the DBMS 110. For instance, the user can create, update, and/or query data models at the database 120 using SQL statements input via the user interface 210.

In some implementations of the current subject matter, the parser 212 can be configured to parse SQL statements, which can be received from the user via the user interface 210. The parser 212 can be configured to recognize when a SQL statement includes syntax for defining one or more SQL associations such as, for example, the SQL CREATE TABLE statements set forth in Table 3. Furthermore, the parser 212 can be configured to recognize when a SQL statement includes syntax for SQL association propagation such as, for example, the SQL CREATE VIEW statement set forth in Table 6. To further illustrate, Table 7 below depicts the formal syntax for SQL association propagation.

TABLE 7

CREATE VIEW view_name AS subquery
WITH ASSOCIATIONS(association_def_list)
association_def_list : association_def_list, association_def
association_def : forward_join_def | propagation_def
propagation_def : [schema.][table.]association_identifier [AS alias]

In some implementations of the current subject matter, the presence of SQL association propagation syntax can trigger the generation of SQL association propagation information. That is, when the parser 212 detects the presence of SQL association propagation syntax in a SQL CREATE VIEW statement, the parser 212 can generate a corresponding association propagation data structure. This association propagation data structure can be populated with information associated with the SQL association including, for example, the name of the schema, the name of the data model, the name of the SQL association, and/or an alias for the SQL association. The alias for the SQL association can be different from the name of the SQL association and can provide an alternative means for referencing the SQL association. Furthermore, this association propagation information can be part of a create view data structure holding a collection of association propagation data structures.

Figure 3A:
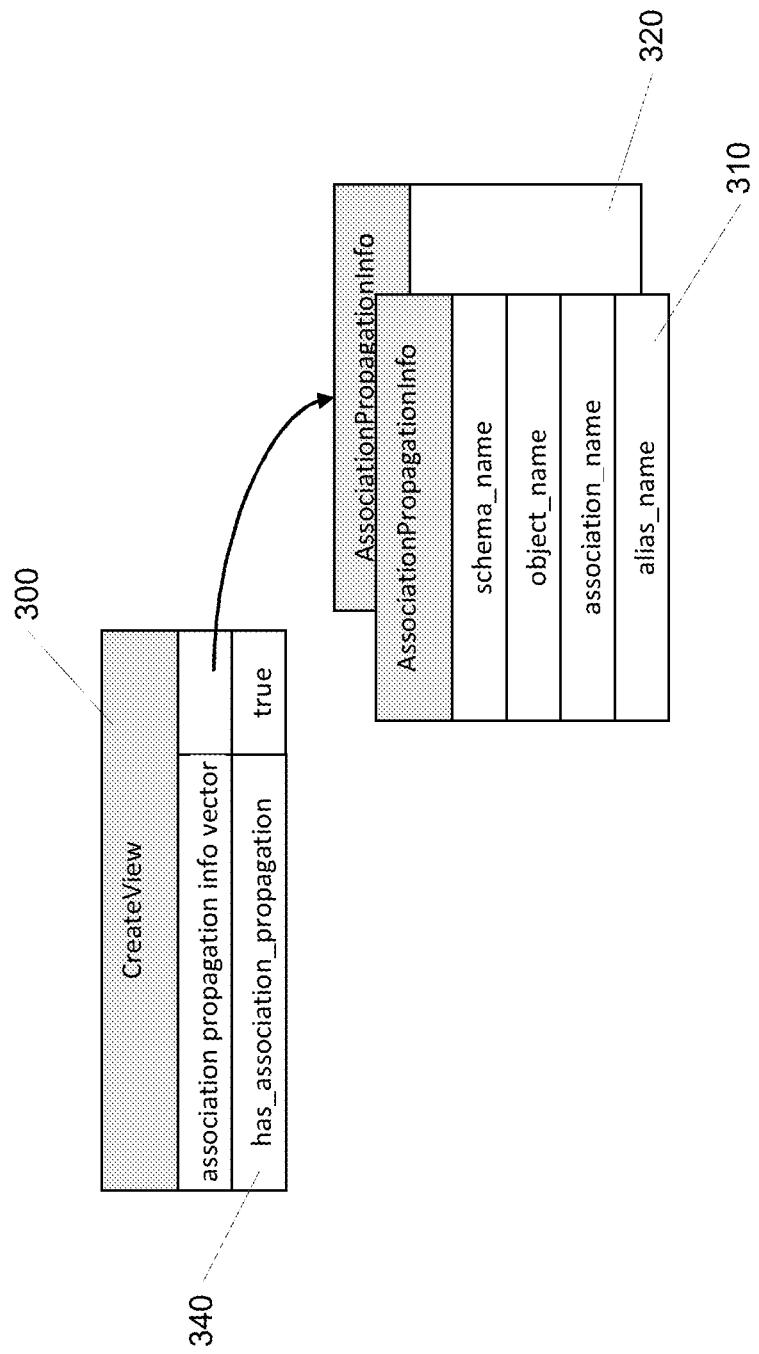
FIG. 3A depicts an association propagation data structure consistent with implementations of the current subject matter.

FIG. 3A depicts an association propagation data structure 310 consistent with implementations of the current subject matter. As shown in FIG. 3A, the association propagation data structure 310 can be a vector containing information associated with a SQL association that is referenced in a SQL CREATE VIEW statement. The association propagation data structure 310 can be part of a create view data structure 300 that includes a collection of association propagation data structures such as, for example, the association propagation data structure 310 and another association propagation data structure 320. In some implementations of the current subject matter, the parser 212 can generate the association propagation data structure 310 in response to detecting SQL association propagation syntax for a SQL association in a SQL CREATE VIEW statement such as, for example, the SQL CREATE VIEW statement shown in Table 6. Meanwhile, the parser 212 can generate the other association propagation data structure 320 in response to detecting SQL association propagation syntax for another SQL association in the same SQL CREATE VIEW statement.

In some implementations of the current subject matter, the propagator 214 can be configured to propagate the information required to fully define the SQL associations that are referenced in a SQL CREATE VIEW statement such as, for example, the SQL CREATE VIEW statement set forth in Table 6. Referring again to FIG. 3A, in addition to holding a collection of association propagation data structures, the create view data structure 300 can further include an indicator, such as a flag 340, for when the SQL view has one or more SQL associations require propagation. The flag 340 can be set by the parser 212 in response to detecting SQL association propagation syntax. Meanwhile, based on the flag 340, the propagator 214 can determine when to propagate SQL associations. To further illustrate, the flag 340 for the create view data structure associated with the SQL CREATE VIEW statement set forth in Table 6 can be set to indicate that presence of the SQL associations "Address," which requires propagation. The flag 340 can trigger the propagator 214 to propagate the SQL association "Address."

In some implementations of the current subject matter, the propagator 214 can verify a SQL association prior to propagating the SQL association. For example, verification of a SQL association can include determining whether the SQL association is related to the subquery set forth in the SQL CREATE VIEW statement. Furthermore, verifying a SQL association can include checking for duplicate SQL association names and checking whether the condition column of the SQL association matches a projection column of the subquery. In the earlier example, the propagator 214 can determine whether the SQL association "Address" is related to the SELECT operation set forth in the SQL CREATE VIEW statement. The propagator 214 can further determine whether the SQL association "Address" is a duplicate of another existing SQL association. Alternately and/or additionally, the propagator 214 can determine whether the condition column of the SQL association "Address" match a projection column of the SELECT operation set forth in the SQL CREATE VIEW statement.

In some implementations of the current subject matter, the propagator 214 can propagate a SQL association upon successfully verifying the SQL association. For instance, the propagator 214 can propagate the SQL association "Address" based on a corresponding association propagation data structure such as, for example, the association propagation data structure 310. Propagating a SQL association can include retrieving the information associated with the SQL association, which has been stored as metadata by the parser 212. Furthermore, propagating the SQL association can include determining an object name and an object scheme based on the view name and the view schema.

Figure 3B:
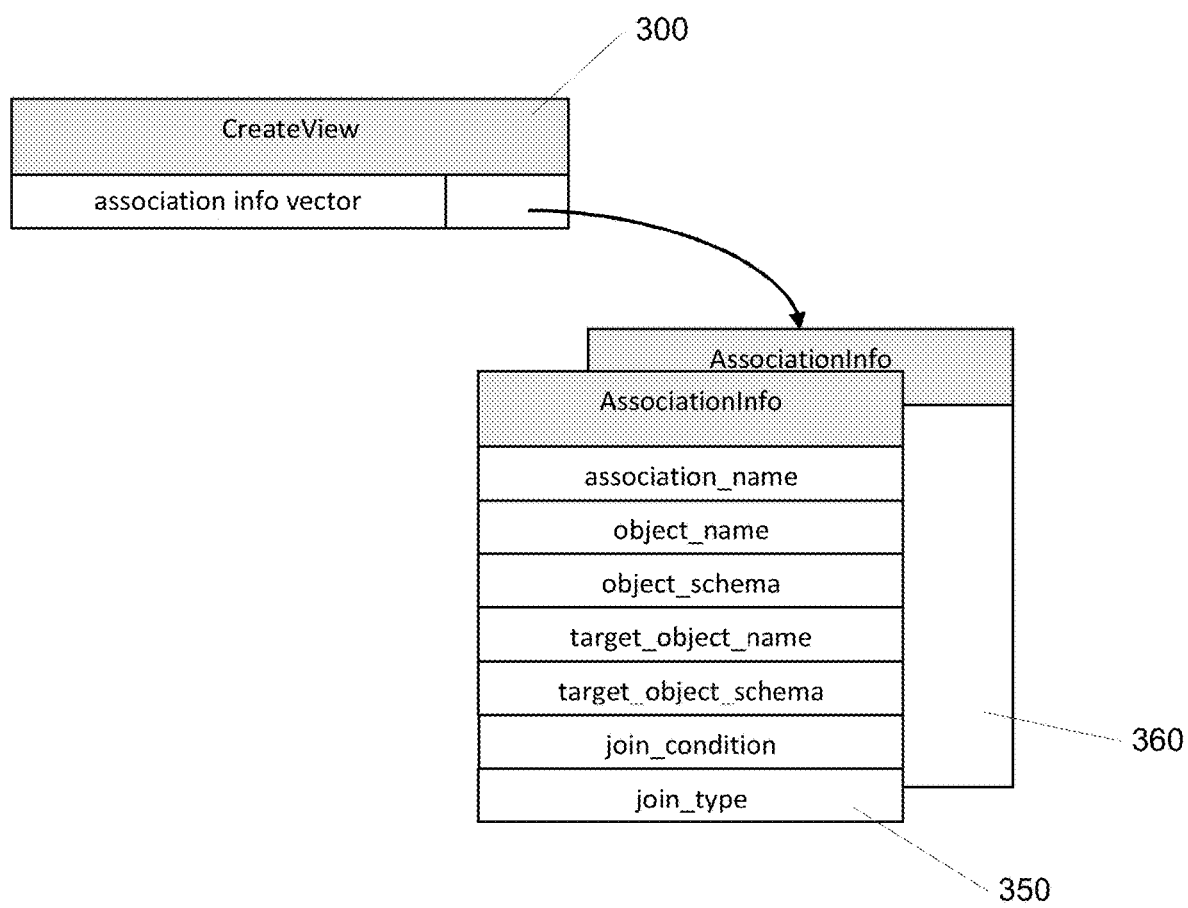
FIG. 3B depicts an association data structure consistent with implementations of the current subject matter.

FIG. 3B depicts an association data structure consistent 350 with implementations of the current subject matter. In some implementations of the current subject matter, the propagator 214 can propagate a SQL association based on the corresponding association propagation data structure. For example, the propagator 214 can propagate the SQL association "Address" based on the association propagation data structure 310. Propagating the SQL association "Address" can include populating the association propagation data structure 310 with information associated with the SQL association "Address," which has been stored as metadata when the SQL association "Address" is initially defined and created. As such, propagating the SQL association "Address" can generate the corresponding association information data structure 350.

As shown in FIG. 3B, the association information data structure 350 can include the name of the SQL association (e.g., "Address"). The association information data structure 350 can further include the name and schema of data models that are being combined. For instance, with respect to the SQL CREATE VIEW statement set forth in Table 6, the association information data structure can include the name and schema of the EMPLOYEES table and the ADDRESSES table. Furthermore, the association information data structure 350 can include the JOIN condition (e.g., matching address identifiers) as well as the JOIN type (e.g., LEFT OUTER JOIN).

In some implementations of the current subject matter, the executor 216 can be configured to execute one or more SQL statements that have been parsed by the parser 212 and/or preprocessed by the propagator 214. For example, the executor 216 can execute a SQL CREATE VIEW statement, such as the SQL CREATE VIEW statement set forth in Table 6, to generate a corresponding SQL view. According to some implementations of the current subject matter, the executor 216 can execute a SQL CREATE VIEW statement based on a corresponding create view data structure. For example, the executor 216 can generate the SQL view "TempEmployees" based on the SQL associations defined by the association information data structures associated with the create view data structure 300. The create view data structure 300 can include multiple associations information data structures including, for example, the association information data structure 350 and another association information data structure 360. As noted earlier, the association information data structure 350 can be populated with information associated with the SQL association "Address." Based on the association information data structure 350, the executor 216 can execute the SQL CREATE VIEW statement including the SQL association which combines related data from the EMPLOYEES table and the ADDRESSES table based on matching address identifiers.

Figure 4:
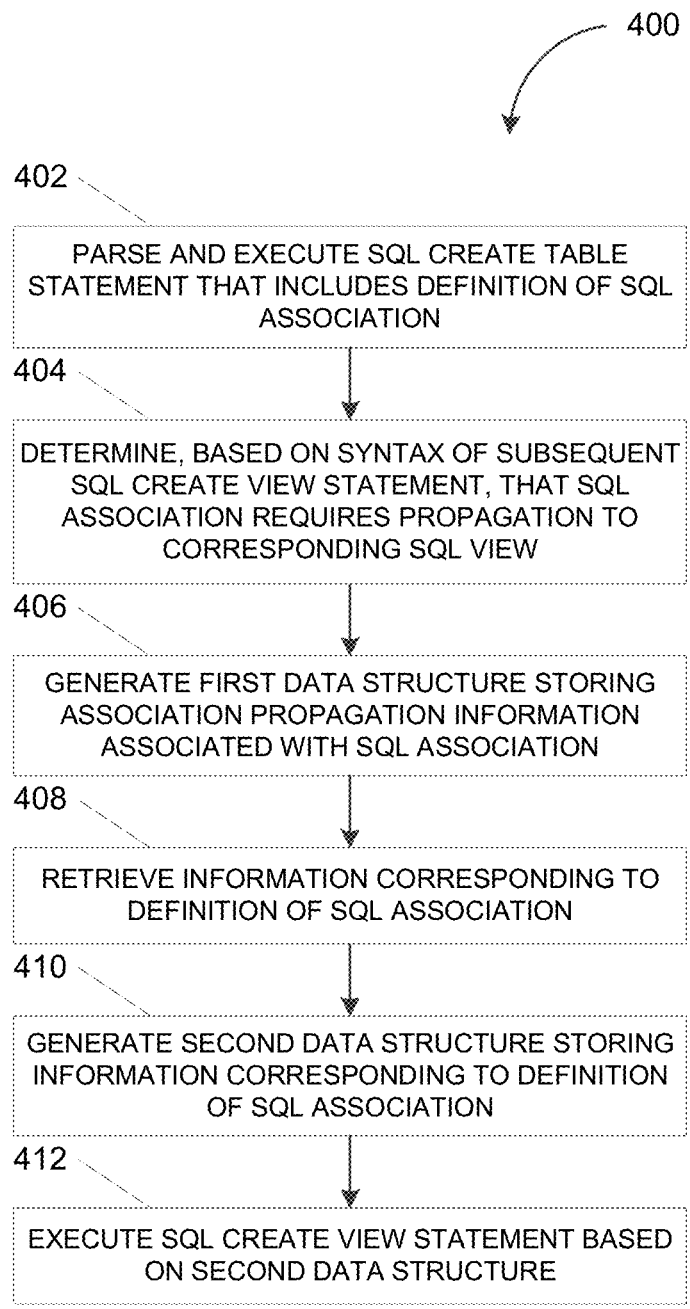
FIG. 4 depicts a flowchart illustrating a process for propagating a SQL association consistent with implementations of the current subject matter.

FIG. 4 depicts a flowchart illustrating a process 400 for propagating a SQL association consistent with implementations of the current subject matter. Referring to FIGS. 1-4, the process 400 can be performed by the DBMS 110.

The DBMS 110 can parse and execute a SQL CREATE TABLE statement that includes a definition of a SQL association (402). For example, the DBMS 110 (e.g., the executor 216) can execute the SQL CREATE TABLE statements set forth in Table 3. For example, one SQL CREATE TABLE statement can create the EMPLOYEES table with a SQL association linking the EMPLOYEES table with the ADDRESSES table. Another SQL CREATE TABLE statement can create the ADDRESSES table with a SQL association linking the ADDRESSES table with the CITIES table.

During the parsing and execution of the SQL CREATE TABLE statement, the DBMS 110 can be configured to store, as metadata, information associated with the SQL associations defined within the SQL CREATE TABLE statement. The information associated with a SQL association can include the name of the data models and/or the name of the schemas that are being combined by the forward-defined JOIN underlying the SQL association. Furthermore, the information associated with a SQL association can include the conditions associated with the forward-defined JOIN. In addition, the information associated with a SQL association can include the type of JOIN that is the forward-defined JOIN clause underlying the SQL association.

The DBMS 110 can determine, based on the syntax of a subsequent SQL CREATE VIEW statement, that the SQL association requires propagation to a corresponding SQL view (404). Table 7 sets forth the formal syntax for SQL association propagation. In some implementations of the current subject matter, the DBMS 110 (e.g., the parser 212) can recognize when a SQL statement, such as the SQL CREATE VIEW statement set forth in Table 6, contains formal syntax for SQL association propagation.

The DBMS 110 can generate a first data structure storing association propagation information associated with the SQL association (406). In response to detecting formal syntax for SQL association propagation, the DBMS 110 (e.g., the parser 212) can generate a corresponding association propagation data structure. For example, the DBMS 110 can respond to the presence of SQL association propagation syntax in the SQL CREATE VIEW statement set forth in Table 6 by generating the association propagation data structure 310. The association propagation data structure 310 can be populated with information associated with the SQL association including, for example, the schema of the data model, the name of the data model, the name of the SQL association, and/or an alias for the SQL association. Furthermore, the association propagation data structure 310 can be part of the create view data structure 300, which includes an association propagation data structures for each SQL association referred in the SQL CREATE VIEW statement.

The DBMS 110 can retrieve information corresponding to the definition of the SQL association (408). For example, the DBMS 110 (e.g., the preprocessor 214) can retrieve information associated with the SQL association, which was stored during operation 402 of the process 400. As noted earlier, this information can include the name and schemas of the data models being combined by the forward-defined JOIN, the JOIN condition, and/or the type of JOIN.

The DBMS 110 can generate a second data structure storing the information corresponding to the definition of the SQL association (410). For example, the DBMS 110 (e.g., the preprocessor 214) can generate the association information data structure 350 by populating the association propagation data structure 310 with the information retrieved at operation 406. The association information data structure 350 can include the name of the SQL association. The association information data structure 350 can further include the name and schema of data models that are being combined by the forward-defined JOIN operation. Furthermore, the association information data structure 350 can include the JOIN condition as well as the JOIN type.

The DBMS 110 can execute the SQL CREATE VIEW statement based on the second data structure (412). In some implementations of the current subject matter, the DBMS 110 (e.g., the executor 216) can execute the SQL CREATE VIEW statement based on the association information data structure 350. That is, based on the association information data structure 350, the DBMS 110 can execute the SQL CREATE VIEW statement including the SQL association which combines related data from the EMPLOYEES table and the ADDRESSES table based on matching address identifiers.

Figure 5:
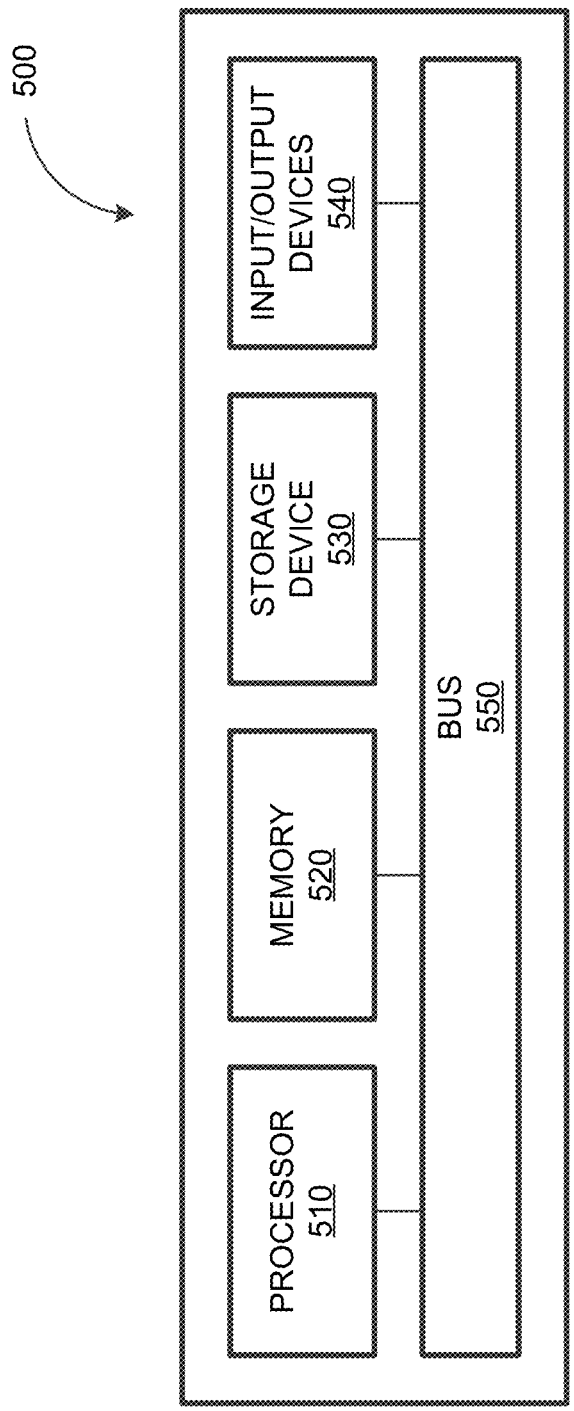
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 2-3 and 5, the computing system 500 can be used to implement the DBMS 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the DBMS 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
   determining, based at least on a syntax of a structure query language (SQL) create view statement, that a SQL association requires propagation to a SQL view associated with the SQL create view statement, the SQL association combining data from at least a first data model and a second data model at a database, and the SQL view comprising at least a portion of the combined data;
   generating an association information data structure storing information corresponding to a definition of the SQL association;
   in response to determining that the SQL association requires propagation, generating an association propagation data structure storing an association propagation information, the generating of the association information data structure comprises populating the association propagation data structure with the information corresponding to the definition of the SQL association, and the information corresponding to the definition of the SQL association including a name of the association, a schema of the first data model, a name of the first data model, a schema of the second data model, a name of the second data model, a join condition, and a type of join; and
   executing, based on the association information data structure, the SQL create view statement.

2. The computer-implemented method of claim 1, wherein the syntax of the SQL create view statement includes a reference to the SQL association.

3. The computer-implemented method of claim 1, wherein the definition of the SQL association is omitted from the SQL create view statement.

4. The computer-implemented method of claim 1 wherein the association propagation information includes a schema of the first data model, a name of the first data model, a name of the SQL association, and/or an alias for the SQL association.

5. The computer-implemented method of claim 1, further comprising:

generating a create view data structure corresponding to the SQL view, the create view data structure including the association propagation data structure, and the create view data structure further including an indicator that the SQL view includes the SQL association that requires propagation.

6. The computer-implemented method of claim 1, wherein the SQL association comprises a SQL join operation that combines, based on one or more conditions, data from the first data model and data from the second data model.

7. The computer-implemented method of claim 1, further comprising:
  executing a SQL create table statement that includes the definition of the SQL association, the executing of the SQL create table statement comprises storing the information corresponding to the definition of the SQL association as metadata.

8. A system, comprising:
  at least one processor; and
  at least one memory including program code which when executed by the at least one processor causes operations comprising:
    determining, based at least on a syntax of a structure query language (SQL) create view statement, that a SQL association requires propagation to a SQL view associated with the SQL create view statement, the SQL association combining data from at least a first data model and a second data model at a database, and the SQL view comprising at least a portion of the combined data;
    generating an association information data structure storing information corresponding to a definition of the SQL association;
    in response to determining that the SQL association requires propagation, generating an association propagation data structure storing an association propagation information, the generating of the association information data structure comprises populating the association propagation data structure with the information corresponding to the definition of the SQL association, and the information corresponding to the definition of the SQL association including a name of the association, a schema of the first data model, a name of the first data model, a schema of the second data model, a name of the second data model, a join condition, and a type of join; and
    executing, based on the association information data structure, the SQL create view statement.

9. The system of claim 8, wherein the syntax of the SQL create view statement includes a reference to the SQL association.

10. The system of claim 8, wherein the definition of the SQL association is omitted from the SQL create view statement.

11. The system of claim 8, further comprising:
  generating a create view data structure corresponding to the SQL view, the create view data structure including the association propagation data structure, and the create view data structure further including an indicator that the SQL view includes the SQL association that requires propagation.

12. The system of claim 8, wherein the SQL association comprises a SQL join operation that combines, based on one or more conditions, data from the first data model and data from the second data model.

13. The system of claim 8, further comprising:
  executing a SQL create table statement that includes the definition of the SQL association, the executing of the SQL create table statement comprises storing the information corresponding to the definition of the SQL association as metadata.

14. A non-transitory computer-readable storage medium including program code, which when executed by at least one data processor, cause operations comprising:
  determining, based at least on a syntax of a structure query language (SQL) create view statement, that a SQL association requires propagation to a SQL view associated with the SQL create view statement, the SQL association combining data from at least a first data model and a second data model at a database, and the SQL view comprising at least a portion of the combined data;
  generating an association information data structure storing information corresponding to a definition of the SQL association;
  in response to determining that the SQL association requires propagation, generating an association propagation data structure storing an association propagation information, the generating of the association information data structure comprises populating the association propagation data structure with the information corresponding to the definition of the SQL association, and the information corresponding to the definition of the SQL association including a name of the association, a schema of the first data model, a name of the first data model, a schema of the second data model, a name of the second data model, a join condition, and a type of join; and
  executing, based on the association information data structure, the SQL create view statement.

* * * * *